United States Patent Office
2,968,853
Patented Jan. 24, 1961

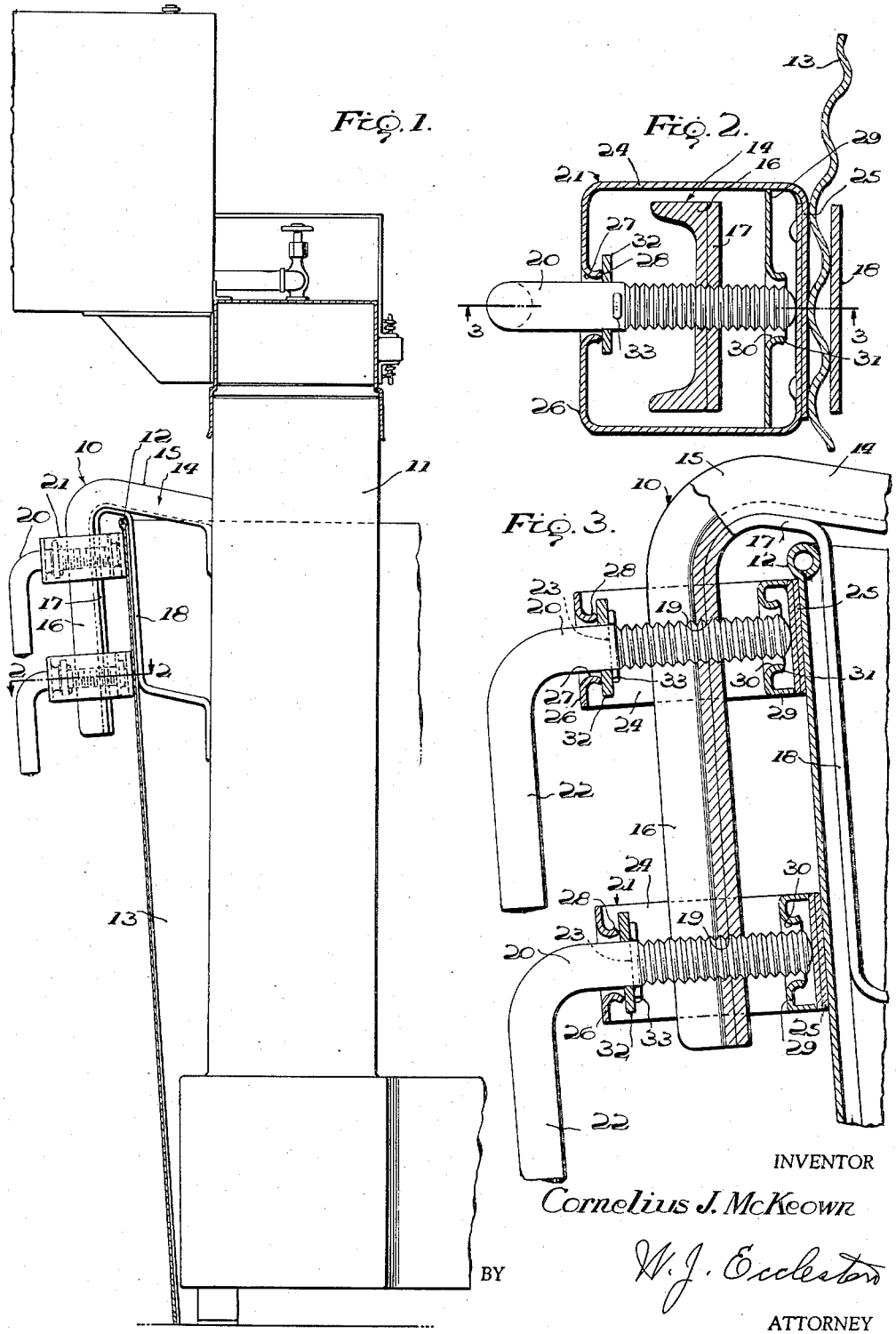

2,968,853

ANCHORING CLAMP

Cornelius J. McKeown, Natick, Mass., assignor to the United States of America as represented by the Secretary of the Army Filed Apr. 22, 1959, Ser. No. 808,283

2 Claims. (Cl. 24—263)

(Granted under Title 35, U.S. Code (1952), sec. 266)

The invention described herein, if patented, may be manufactured and used by or for the Government for governmental purposes without the payment to me of any royalty thereon.

This invention relates to an improvement in screw type anchoring clamps and more particularly to an improved means for distributing the clamping force applied by the clamp.

While there are a great many situations wherein it is desired to removably clamp a piece of equipment to a related item, the improved anchoring clamp of the present invention was especially designed to releasably fix a gasoline-burning immersion type water heater such as that disclosed in U.S. Patent No. 2,737,175, for example, to the edge of a water container. This type of water heater is presently used by the Armed Forces in conjunction with a conventional corrugated can for heating dish water and the like but has also been used in various other situations where more refined water heating methods are not available.

The anchoring clamp presently in use on immersion water heaters as disclosed in Military Specification MIL–H–1597 dated October 31, 1949, comprises a bracket fixed to the body of the heater and conformed to loosely engage the upper edge of the water container body. A pair of clamping screws is threaded through the outer portion of the bracket for engaging the container wall to clamp the heater in position. In this configuration the screw ends tend to dent and even perforate the container walls, and irregularities in the container walls such as corrugations or accidentally formed dents, often prevent effective clamping action. While many of the pressure pads available in the prior art would appear to be available to resolve these difficulties, the extremely rugged treatment which the anchoring clamps are subjected to in the field use of immersion heaters and the requirements for assembly and disassembly for repair and replacement purposes in the field without the aid of special tools demand a special capability from the pressure pad which is uniquely met by the present invention.

Perhaps the most common type of pressure pad which would be considered in the present application is the simple circular pad which is often seen on anchoring clamps for outboard motors and the like and on common C clamps. This type of pressure pad is normally attached to the clamping screw by means of a ball and socket joint which, while providing desirable adaptability to various irregular surfaces, requires the use of special purpose tools for assembly and is therefore not susceptible of repair or replacement under field conditions. Numerous other types of special purpose pressure pads are also available but have been found to be unsatisfactory in the present application through lack of strength, susceptibility of loss or difficulties in repair and replacement.

It is therefore an important object of this invention to provide a screw type anchoring clamp with a new and improved pressure pad which can be easily assembled in the field without the aid of special tools.

A further object of this invention is to provide a new and improved screw type anchoring clamp wherein the movable parts are not subject to loss or accidental removal.

A still further object of this invention is to provide an improved means for distributing the clamping force applied by a screw type anchoring clamp over the surface of the material to be clamped.

Another object of the invention is to provide a new and improved clamp as defined in the preceding object in which the distribution of clamping force is not affected by irregularities in the surface to be clamped and which compensates for those irregularities so that the part to be clamped is firmly held at a desired position.

A still further object of this invention is to provide a relatively simple and extremely rugged pressure pad for a screw type clamp.

Other objects, capabilities and advantages of this invention will become apparent during the course of the following description wherein reference is made to the accompanying drawing forming a part of this application in which like numerals are used to designate like parts throughout the same, and in which:

Figure 1 is a fragmentary vertical section of a water container showing an immersion type water heater mounted therein by means of the improved anchoring clamp of the present invention;

Figure 2 is a sectional view on the plane of the line 2—2 on Figure 1; and

Figure 3 is a vertical sectional view on the plane of the line 3—3 on Figure 2.

Referring more particularly to the drawings wherein, for the purpose of illustration, a preferred embodiment of the invention is shown, Figure 1 shows the improved anchoring clamp of the present invention, designated in its entirety by the numeral 10, fixed to the upper end of the flue of an immersion type water heater 11 whereby the heater may be rigidly clamped to the rim 12 of a water container 13. The side walls of this container may taper from the vertical as shown in Figure 1 and may be corrugated as is the side wall of the 32 gallon corrugated can with which immersion heaters are commonly used by the Armed Forces. As shown in Figures 2 and 3 the anchoring clamp comprises a channel-shaped main body portion 14 one end of which is welded to the body of the water heater 11. This fixed main body portion includes a part 15 which projects outwardly from the body of the water heater and a part 16 depending from the part 15 in spaced relation to the body of the water heater and generally parallel to the side thereof. The clamp body 14 also includes a flat strap-like member 17 which is welded at one end to the body of the water heater and includes a portion 18 lying between the side of the water heater and the depending portion 16 of the main body portion 15 opposed and generally parallel thereto to form an abutment against which the inner side of the container 13 is firmly clamped by the movable component of the improved clamping means hereafter described. The depending portion 16 is provided with one or more threaded apertures 19 therethrough for a purpose to be described.

The movable component of the improved clamping means of the present invention comprises a threaded member or clamp screw 20 and a pressure pad designated in its entirety by the number 21. One of these threaded clamping members 20 is provided for engaging in each of the threaded apertures 19 in the clamp body. These clamping members or screws include means such as the angular handle forming portion 22 for manual operation and are adapted for threaded movement toward and from the abutment 18. The clamp screws 20 are each further provided with a diametrical aperture 23 therethrough spaced from the end of the threaded portion for a purpose to be described.

The improved pressure pad of the present invention comprises a generally rectangular shaped open strap metal body 24 which may be formed to provide a double thickness of material in the forward end wall 25 thereof as best shown in Figures 2 and 3. The generally rectangular opening defined by the pressure pad body 24 is sized to permit the pressure pad 21 to be freely received from the fixed depending portion or leg 16 of the clamp body 14 and for substantial movement of the pressure pad relative to the depending leg 16 toward and from the opposed abutment forming portion 18 of the strap-like body member 17. The rear end wall 26 of the pressure pad body 24 is provided with an aperture 27 therethrough having an inwardly directed integral flange or collar 28. This aperture 27 is sized to loosely receive the clamp screw 20 therein. A guide bar 29, which may be of channel shape in transverse cross section, is fixed on the inner side of the forward end wall 25 of the pressure pad body 24. The guide bar is provided with an aperture 30 therein axially aligned with the aperture 27 in the rear end wall and having an integral flange or collar 31 formed thereon. This aperture, like the aperture 30, is also sized to loosely receive the clamp screw 20 therein, the fit of these apertures being made loose for a purpose to be described.

In the assembly of the anchoring clamp of the present invention the pressure pad 21 is placed on the clamp body 14 with the aperture 27 in the rear end wall and the aperture 30 in the guide bar aligned with the threaded aperture 19 in the depending leg 16 of the clamp body 14. The clamp screw 20 is inserted through the aperture 27 and a washer 32 placed thereon. The clamp screw 20 is then threaded into the aperture 19 until the forward end thereof passes through the aperture 30 in the guide bar 29 and engages the inner side of the forward end wall 25 of the pressure pad. A common cotter pin 33 is then inserted in the previously mentioned diametrical aperture 23 in the clamp screw 20 between the washer 32 and the depending leg 16 of the clamp body 14. The pressure pad 21 and the clamp screw 20 are thereby fixed in operating relation with the cotter pin 33 and washer 32 cooperating with the flange 28 to withdraw the pressure pad when the clamp screw 20 is turned in a retracting direction, to prevent disengagement of the clamp screw 20 from the aperture 30 in the guide bar 29 and, as will be obvious, to prevent the accidental removal of the clamp screw 20 from the remainder of the clamp.

In the operation of the improved anchoring clamp of the present invention, both of the clamp screws 20 are withdrawn sufficiently to provide an opening between the depending leg 16 of the main clamp body 15 and the abutment forming member 18 to permit the clamp to be positioned over the rim 12 of container 13. In each of the movable components of the clamp, the cooperative action of the cotter pin 33 and washer 32 acting against the flange 28 will cause the pressure pad 21 to be withdrawn with the clamp screw 20. When the clamp body has been placed over the rim of a container, the clamp screw 20 in each of the movable components is advanced bringing the forward wall 25 of the pressure pad into engagement with the container body and firmly clamping the container body between the forward wall of the pressure pad and the abutment forming member 18 whereby the water heater is firmly anchored to the container.

It will be noted that the forward wall 25 of each pressure pad is reinforced by the guide bar 29 and provides a substantial clamping surface for engaging the container wall whereby irregularities in the latter which would interfere with effective clamping action are overcome and the clamping force of the clamp screw 20 is effectively distributed over a relatively large area of the container wall, as best seen in Figures 2 and 3, thus reducing the likelihood of this wall being dented or otherwise damaged.

The loose fit of the clamp screw 20 in the apertures 27 and 30 permits a predetermined amount of universal angular rocking movement of the pressure pad with respect to the clamp screw 20 to permit the pressure pad to align itself with the sidewall of the container and thus compensate for irregularities in this surface or for the inclined or curved contour of the surface, as for example the incline and the corrugations which are present in the sidewall 13 of the standard 32 gallon can with which immersion heaters are most commonly used by the Armed Forces, as previously explained.

It can be seen from the foregoing that the present invention provides a rugged anchoring clamp which includes an improved pressure pad which is easily assembled with the simplest of hand tools and which provides protection against accidental disassembly and loss of the various clamp parts. While the present invention is particularly applicable to the herein disclosed use with immersion water heaters, it will be obvious that it is also useful in many other applications of screw type clamps. It is to be understood therefore that the form of the invention herein shown and described is to be taken as a preferred example of the same and that various changes in the shape, size and arrangement of the parts may be resorted to without diverting from the spirit of the invention or the scope of the subjoined claims.

I claim:

1. Clamping structure comprising elongated rigid legs fixed in opposed spaced relation loosely to receive the part to be clamped therebetween, a pressure pad comprising a substantially rigid body of strap-like metal including at least one pair of opposed generally parallel walls to form the front and rear of said pressure pad, a guide member rigidly fixed to the inner side of the front of said pressure pad, said guide member and the rear of said pressure pad each having an aperture therein of predetermined diameter and the said apertures being axially aligned, a clamping screw including a shank dimensioned to project through said aligned apertures for thereby supporting said pressure pad on said screw and a tip to engage the inner side of the front of said pressure pad, the shank of said screw including a threaded portion threaded through one of the said rigid legs so as to carry the front of said pressure pad toward clamping engagement with the part to be clamped upon predetermined rotary movement of said clamping screw, and means detachably mounted on said clamping screw at a point remote from said tip, said means being positioned on said screw to cooperate with the rear of said pressure pad for causing the latter to be retracted when the clamp screw is rotated in the opposite direction and to prevent withdrawal of said screw from aperture in said guide member, the said apertures in said guide member and the rear of said pressure pad being of somewhat larger diameter than the shank of said clamping screw to permit limited universal rocking movement of the pressure pad on said shank during clamping and thereby compensate for irregularities in the surface being clamped.

2. An anchoring clamp comprising a body having opposed generally parallel legs one of which is provided with a threaded aperture therethrough, a pressure pad receivable on said apertured leg comprising a strap metal body conformed to define a generally rectangular opening sized to permit limited universal rocking movement and substantial fore and aft movement of said pressure pad relative to said apertured leg, a guide bar fixed within said opening adjacent to the side of said pressure pad body lying between said legs, said guide bar and the side of said body opposite thereto being provided with axially aligned apertures therethrough, a clamping screw having a shank dimensioned to project through said aligned apertures for thereby supporting said pressure pad on said screw and a tip to engage the inner side of the side of said pressure pad body lying between said legs, the shank of said screw including a threaded portion threaded through the said threaded aperture in said leg so as to carry the front of said pressure pad toward clamping engagement with the other of said legs upon predetermined rotary movement of said clamping screw, said shank being provided with a diametrical aperture at a point remote from said tip, and means detachably engaging in said aperture in said shank cooperating with said pressure pad body to prevent said screw from being withdrawn from engagement in said apertures, the said aligned apertures being of somewhat larger diameter than the shank of said clamping screw to permit limited universal rocking movement of the pressure pad on said shank during clamping to thereby compensate for irregularities in the surface being clamped.

References Cited in the file of this patent

UNITED STATES PATENTS

| | | |
|---|---|---|
| 956,157 | Parmley | Apr. 26, 1910 |
| 1,132,362 | Lawless | Mar. 16, 1915 |
| 1,354,390 | Gilmore | Sept. 28, 1920 |
| 2,529,432 | Tenner | Nov. 7, 1950 |
| 2,865,591 | Holinshead | Dec. 23, 1958 |